3,128,317
SELECTIVE HYDROGENATION OF ACETYLENE
IN ETHYLENE WITH A ZEOLITIC CATALYST
Alfred Arkell and Dwight M. Smith, Wappingers Falls, N.Y., and Morford C. Throckmorton, Akron, Ohio, assignors to Texaco Inc., New York, N.Y., a corporation of Delaware
No Drawing. Filed Jan. 13, 1961, Ser. No. 82,409
6 Claims. (Cl. 260—677)

This invention relates to the hydrogenation of acetylene, and, more particularly, to the selective hydrogenation of acetylene in a gaseous stream comprising acetylene and its lower molecular weight homologs in admixture with ethylene and other low molecular weight olefins.

In its more specific aspect this invention relates to the catalytic method, and catalyst, for removal of acetylene from a gaseous stream comprising acetylene and ethylene, whereby the acetylene is selectively hydrogenated and converted, at least in part, to ethylene.

In the conventional practice for the manufacture of ethylene and other low molecular weight olefins, a hydrocarbon material, e.g. naphtha or heavy oil, optionally in the presence of steam, is passed through a cracking operation to convert the hydrocarbon to the olefin and hydrogen. Cracking often results in the production of a small quantity of acetylene which not only contaminates the product but may also interfere with a number of uses for which ethylene is intended. It is therefore desirable that the acetylene be removed from the mixture without any substantial loss in the olefinic constituent.

This invention therefore has as its purpose to provide a method, and catalyst, for the selective hydrogenation of acetylene in a gaseous stream in admixture with ethylene.

This invention involves broadly the selective hydrogenation of acetylene from a gaseous hydrocarbon mixture comprising acetylene and ethylene by contacting the gaseous mixture in the presence of hydrogen with a catalyst of the crystalline zeolite type derived from a metal aluminum silicate and commonly referred to as a zeolite. While there are naturally occurring zeolitic materials, the greater proportion of the zeolites are produced synthetically and this invention is described hereinbelow in greater detail in connection with synthetic crystalline zeolites. The zeolites are made up of porous crystals wherein the pores of the crystals are of molecular dimension and are of uniform size. The zeolites include a certain proportion of water of hydration, and the metal portion of the zeolite is normally an alkaline metal or an alkaline earth metal, or combinations thereof.

In the catalyst structure of our invention, a major portion of the metal ion, e.g. the alkali metal of the zeolite, is replaced by copper and preferably the metal ion is substantially completely replaced by copper. The sodium aluminum silicate zeolites, such as the zeolite sold under the trade name "Doucil," are particularly applicable for the preparation of catalysts in accordance with this invention whereby at least a major portion of the sodium ion of the zeolite is replaced with copper. However, other synthetic zeolites, such as those manufactured by Linde Air Products Company may be satisfactorily employed in the preparation of the catalyst.

A synthetic zeolite useful as the starting material in preparation of the catalyst may contain about 2 to 10% by weight sodium. In preparing the catalyst for use in this invention, the sodium may be replaced by copper by conventional practice. For example, an aqueous copper solution may be prepared by dissolving a soluble copper salt in water, and the copper solution, desirably at room temperature, is passed thorugh an ion exchange column containing the zeolite. The passage of the copper solution is continued until a major portion, or substantially all, of the sodium ion is replaced by the copper cation which may be determined by chemical analyses. Suitable copper salts for carrying out the exchange reaction include, for example, copper nitrate, copper acetate or copper sulfate, and the concentration of the copper ion preferably is no less than about 0.5 volume formal for performing the reaction within a reasonable period of time. (Volume formal as used herein is defined as a gram-formula weight per liter of solution.) Although saturated solutions of the copper salt may be employed, it is generally desirable not to exceed that effective concentration at which the ion exchange rate diminishes as determined by the activity coefficients and may be ascertained by one skilled in the art.

In carrying out the hydrogenation reaction in accordance with our invention, a gaseous stream of ethylene and acetylene is admixed with hydrogen and the resulting mixture is passed into contact with the catalyst herein described. The feed stream comprising ethylene and acetylene may contain hydrogen in which case the added hydrogen may be decreased or eliminated. The proportion of hydrogen present should be sufficient to hydrogenate all of the acetylene present in the gaseous mixture. An excess of hydrogen over that theoretically necessary to react with all the acetylene is usually required in practical operation. In addition, the gaseous mixture may contain other materials including low molecular weight olefins other than ethylene and containing 3 to 5 carbon atoms per molecule, as well as other hydrocarbons, nitrogen, carbon monoxide, carbon dioxide, air and water vapor.

The gaseous stream containing acetylene in admixture with ethylene is contacted with the catalyst at an elevated temperature generally at a temperture range of between about 400° and 700° F., and preferably between 550° and 650° F. Where lower temperatures than the described minimum are employed the hydrogenaton rate is undesirably slow. On the other hand, where temperatures higher than the described maximum are used, cracking, decomposition or other undesirable reactions may occur. Although the pressure employed is not particularly critical, it generally is convenient and economical to conduct the process at atmospheric conditions. However, the process may be conducted at low super-atmospheric pressures, generally not more than about 1.5 atmospheres being required, nor desirable, or pressures below atmospheric may be employed.

In the preferred embodiment, the gaseous stream comprising acetylene and ethylene is passed continuously through a fixed bed containing the copper zeolite type catalyst described herein at suitable operating conditions, the hydrogenation product being recovered from the opposite end of the fixed-bed reactor, also as a continuous stream. The rate of flow or space velocity may be suitably adjusted in the continuous process such that a satisfactory hydrogenation of acetylene is accomplished. The space velocity may vary from about 500 v./v./hr. to 4000 v./v./hr. or higher depending largely on the temperature and the nature of the feed stream. The process is preferably effected at a space velocity of about 2000 v./v./hr. to 3000 v./v./hr., but a longer or shorter space velocity may be used when necessary or desirable.

During use, the catalyst will become inactivated by reason of carbonaceous deposits. The catalyst may be readily reactivated by conventional practice, preferably by contacting the catalyst with free oxygen at an elevated temperature, e.g. 1000° F., for a sufficient time to burn off the carbonaceous deposits. The regenerated catalyst is then contacted with fresh feed stock.

Our invention is further illustrated by the following example wherein a water slurry of "Doucil" (a hydrated sodium aluminum silicate containing about 5.1% by weight sodium) is placed in an ion exchange column measuring approximately 4 feet in length and having an inside diameter of 1⅞ inches. A 2 volume formal aqueous solution of copper nitrate is passed slowly through the column, the copper cation thereby replacing the sodium ion of the "Doucil." Substantially all of the sodium is replaced by copper, as shown by chemical analyses.

A 57 gram portion of the prepared catalyst is placed in a stainless steel reactor having a length of 3⅛ inches and an inside diameter of 1⅝ inches. A feed stream comprising 4% acetylene and 74% ethylene as well as a small amount of air and water vapor is admixed with a stream of hydrogen gas and passed through the catalyst bed under the conditions of 600° F. at atmospheric pressure and a gaseous hourly space velocity of 2500. A total of 97% of the acetylene present in the feed stream is converted, about 60% being converted to ethylene and the balance to acetaldehyde and polymeric materials.

In a second example, a synthetic zeolite manufactured by Linde Air Products Company and designated type 10A is substituted for "Doucil" in the preceding example and the sodium ions of the zeolite replaced by copper as in Example I. The gaseous stream used in Example I is passed through 71 grams of catalyst contained in the stainless steel reactor under the conditions at 600° F. at atmospheric pressure and a gaseous hourly space velocity of 1440. Upon analyses of the recovered product, about 48% of the acetylene is converted to ethylene, the total conversion of acetylene being 97%.

Although the invention has been described in detail in connection with the selective hydrogenation of acetylene, it should be understood that other acetylenic compounds may be present in the gaseous stream undergoing treatment, for example, methyl acetylene, ethyl acetylene, dimethyl acetylene and diacetylene. It also should be understood that olefins and/or diolefins other than ethylene may be present in the feed stream undergoing treatment. These olefins may normally include, for example, propylene, butylene, isobutylene, pentene and the like.

Having described our invention, and certain embodiments thereof, we claim:

1. A process for the selective hydrogenation of acetylene in a gaseous mixture comprising acetylene and ethylene which process comprises contacting under hydrogenation reaction conditions said gaseous mixture together with hydrogen with a catalyst comprising a synthetic zeolite material of metal aluminum silicate wherein at least a major portion of said metal is copper.

2. A process for the selective hydrogenation of acetylene in a gaseous mixture comprising acetylene and ethylene which process comprises contacting said gaseous mixture together with hydrogen at a temperature between 400° and 700° F. with a catalyst comprising a synthetic zeolite material of metal aluminum silicate wherein at least a major portion of said metal is copper.

3. A process for selective hydrogenation of acetylene in a gaseous mixture comprising acetylene and ethylene which process comprises contacting said gaseous mixture together with hydrogen at a temperature between 400° and 700° F. with a catalyst comprising sodium aluminium silicate zeolite at least a major portion of said sodium being replaced by copper.

4. A process for the selective hydrogenation of acetylene in a gaseous mixture comprising acetylene and ethylene which process comprises contacting said gaseous mixture under hydrogenation conditions with a catalyst consisting essentially of a synthetic zeolite material of metal aluminum silicate wherein at least a major portion of said metal is copper.

5. The process of claim 4 in which the hydrogenation conditions include a temperature between 400 and 700° F.

6. A process for the selective hydrogenation of acetylene contained in a gaseous mixture comprising acetylene and ethylene which process comprises contacting said mixture in the presence of an amount of hydrogen sufficient to hydrogenate all of the acetylene present at a temperature between 400 and 700° F. with a catalyst consisting essentially of a metal aluminum silicate which has been prepared by replacing with copper the major portion of sodium present in a synthetic sodium aluminum silicate zeolite.

References Cited in the file of this patent

UNITED STATES PATENTS

| | | |
|---|---|---|
| 2,451,327 | Fasce et al. | Oct. 12, 1948 |
| 2,900,430 | Henke et al. | Aug. 18, 1959 |